US006122802A

United States Patent [19]

Lo

[11] Patent Number: 6,122,802

[45] Date of Patent: Sep. 26, 2000

[54] TOOL HANDLE

[76] Inventor: Chi Yu Lo, P.O. Box 63-99, Taichung 406, Taiwan

[21] Appl. No.: 09/192,665

[22] Filed: Nov. 14, 1998

[51] Int. Cl.[7] ................................ A47J 45/00; E05B 1/00

[52] U.S. Cl. ................................ 16/431; 16/436; 16/902; 16/DIG. 12; 81/489; 81/177.1

[58] Field of Search ............................. 16/431, 436, 430, 16/902, 441, 422, DIG. 12, DIG. 18, DIG. 19; 81/489, 436, 177.1, DIG. 5; 74/551.9, 543, 553; 40/661.12, 314, 331, 663

[56] References Cited

U.S. PATENT DOCUMENTS

| | | | |
|---|---|---|---|
| 1,974,682 | 9/1934 | Margoshes | 40/331 |
| 3,185,001 | 5/1965 | Viator | 81/489 |
| 4,739,536 | 4/1988 | Bandera et al. | 16/430 |
| 4,837,892 | 6/1989 | Lo | 16/430 |
| 5,261,665 | 11/1993 | Downey | 16/DIG. 12 |
| 5,290,063 | 3/1994 | Lenhart | 16/DIG. 12 |
| 5,398,369 | 3/1995 | Heinzelman et al. | 16/DIG. 12 |
| 5,511,331 | 4/1996 | Morosini | 40/316 |
| 5,722,116 | 3/1998 | Lin | 16/DIG. 12 |
| 5,740,586 | 4/1998 | Gomas | 16/DIG. 12 |

FOREIGN PATENT DOCUMENTS

| | | | |
|---|---|---|---|
| 0429408 | 5/1991 | European Pat. Off. | 16/DIG. 12 |

*Primary Examiner*—Chuck Y. Mah

[57] ABSTRACT

A tool handle includes a number of blocks attached to a handle member, and a cover sleeve engaged on the handle member and having a number of orifices for receiving the blocks and for retaining the blocks in place. The handle member and the blocks may be secured together by the engagement of projections and cavities. The user may adjust the blocks into various kinds of shapes and patterns. The blocks may each include one or more openings for receiving the materials of the cover sleeve and for stably securing the blocks to the handle.

4 Claims, 3 Drawing Sheets

5
6
51
61
62
66
70
72
80

TOOL HANDLE

BACKGROUND OF THE INVENTION

1. Field of the Invention

The present invention relates to a tool, and more particularly to a tool handle.

2. Description of the Prior Art

Typical tool handles comprise a solid structure that may not be formed with various patterns.

The present invention has arisen to mitigate and/or obviate the afore-described disadvantages of the conventional tool handles.

SUMMARY OF THE INVENTION

The primary objective of the present invention is to provide a tool handle which may be formed with various kinds of shapes or patterns.

In accordance with one aspect of the invention, there is provided a tool handle comprising a handle body, a plurality of blocks attached to the handle body, the blocks each including at least one opening formed therein, and a cover sleeve engaged on the handle body and including a plurality of orifices formed therein for receiving the blocks.

The handle body includes a plurality of cavities formed therein, the blocks each includes at least one projection engaged into the cavities of the handle body for attaching onto the handle body.

The cover sleeve includes at least one portion engaged into the at least one opening of the block for further solidly securing the block to the handle. The blocks each includes a gap spaced from the handle.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figures 1, 2, 3, 4:
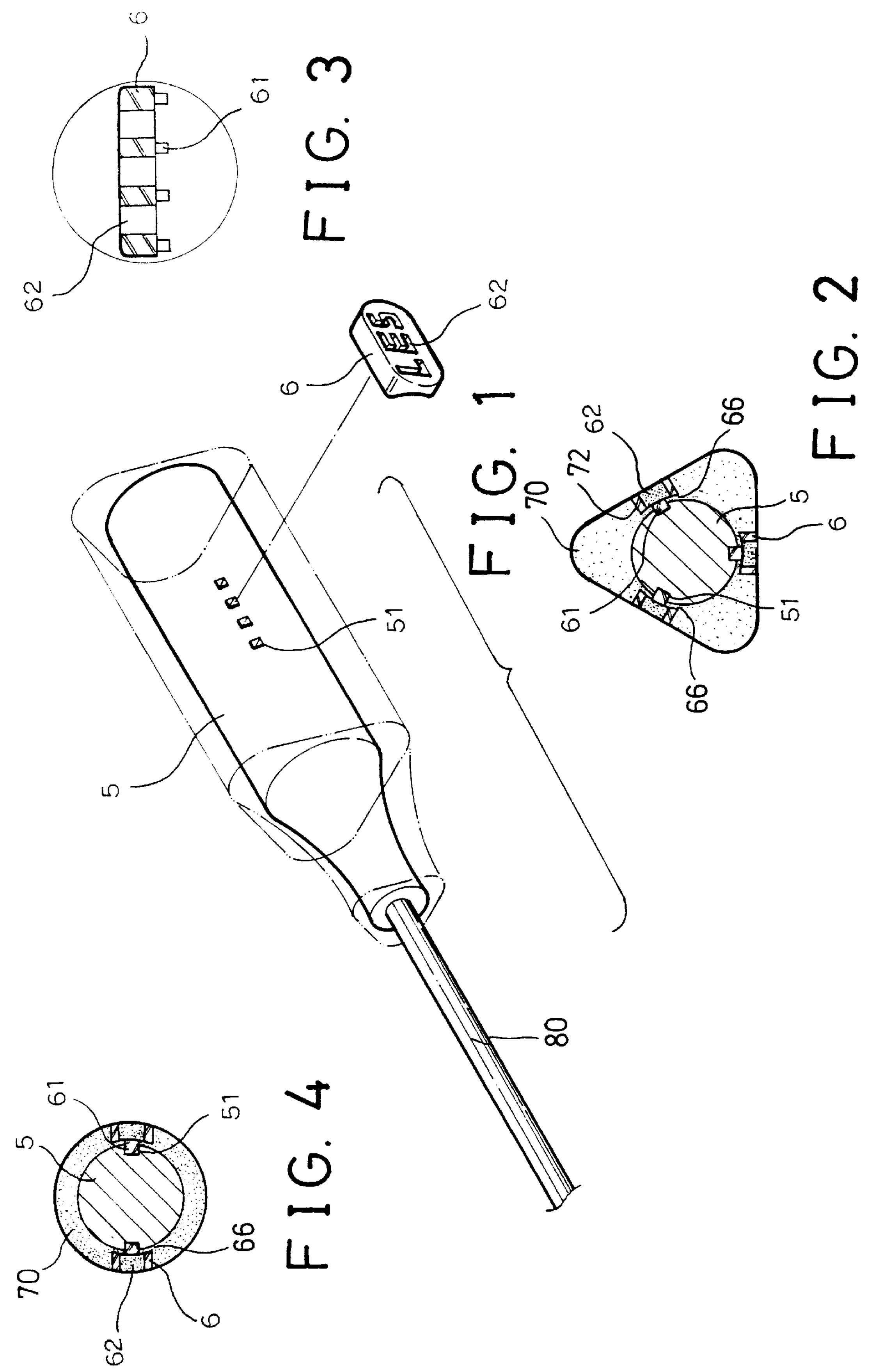
FIG. 1 is a partial exploded view of a tool in accordance with the present invention.
FIG. 2 is a cross sectional view of the tool handle.
FIG. 3 is a cross sectional view of the block.
FIG. 4 is a cross sectional view similar to FIG. 2, showing another application of the tool handle.

Referring to the drawings, and initially to FIGS. 1–3, a tool in accordance with the present invention comprises a tool member 80 secured to a handle 5 so as to be driven by the handle 5. The handle 5 includes a number of cavities 51 formed therein. A number of blocks 6 each includes one or more projections 61 engaged into the cavities 51 of the handle 5 and secured to the handle 5 by such as force-fitted engagement or by adhesive materials. A cover sleeve 70 is then applied onto the outer portion of the handle 5 and includes a number of orifices 72 formed therein for receiving the blocks 6 and for allowing the blocks 6 to be seen through the orifices 72. The blocks 6 may be secured in place by the cover sleeve 70. But, if required, the cover sleeve 70 may also be formed with the orifices 72 therein and then engaged onto the handle 5. The cover sleeve 70 may further apply a retaining force to detachably retain the blocks 6 in place.

Figure 5:
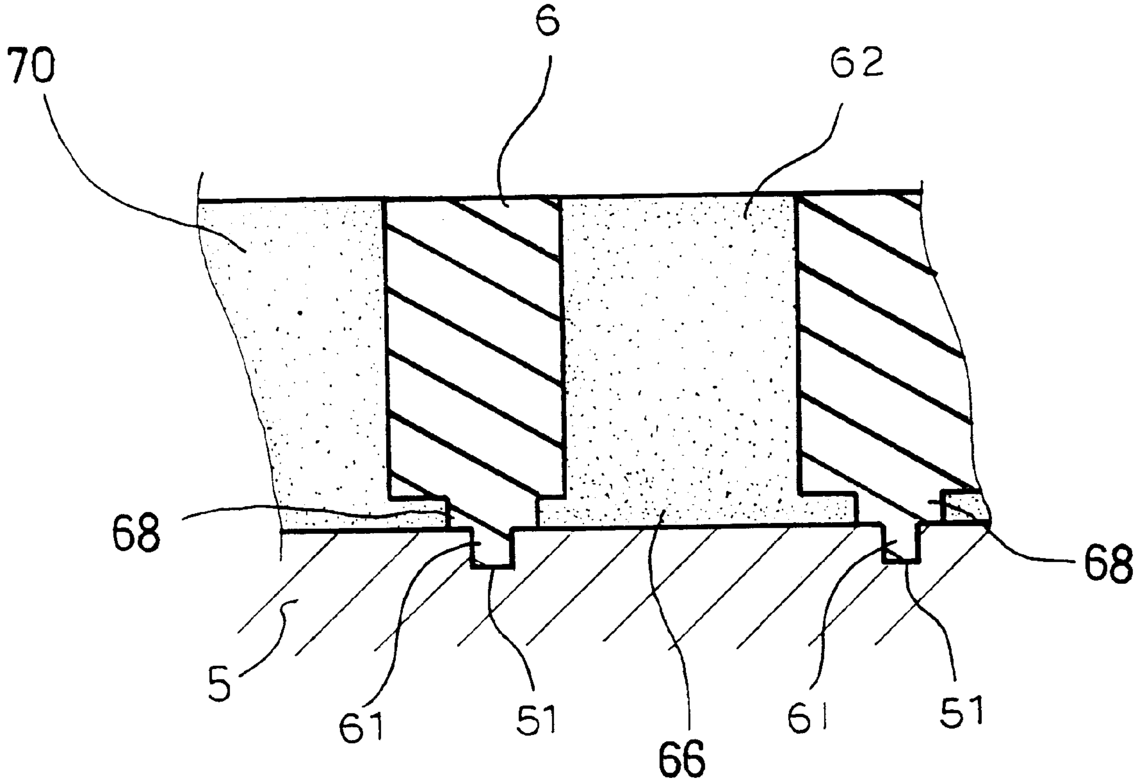
FIG. 5 is an enlarged partial cross sectional view of the tool handle.

It is to be noted that the blocks 6 may be arranged to various shapes or patterns according to the user's need. The user may also rearrange the blocks 6 to the other patterns if required. The handle 5 and the blocks 6 may be secured together and disposed in a mold device and then the cover sleeve 70 may be formed and applied onto the handle 5 by a molding process. The blocks 6 may include one or more openings 62 formed therein. A gap 66 is preferably provided between the blocks 6 and the handle 5. The material for forming the cover sleeve 70 may also be applied into the openings 62, via the gaps 66, during such as the molding process or the cover sleeve 70 may include a portion engaged into the opening(s) 62 during such as the molding process, such that the blocks 6 may further be solidly secured in place by the cover sleeve 70. The cover sleeve 70 may include a triangular shape (FIG. 2) or a circular shape (FIG. 4) or may be formed with different shapes. The projections 61 of the blocks 6 may each include an enlarged root portion 68 (FIG. 5) for engaging with the handle 5 and for forming the gap 66 between the block 6 and the handle 5.

Alternatively, the handle 5 may include a number of projections extended therefrom for engaging into the cavities that are formed in the blocks such that the blocks may also be attached onto the handle 5.

Figure 6:
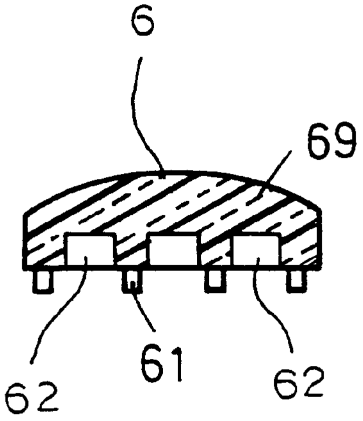
FIG. 6 is a cross sectional view showing another application of the block for the tool handle.

Referring next to FIG. 6, the block 6 may include a solid outer peripheral portion 69 and the openings 62 of the block 6 are not formed through the block 6. The material for forming the handle 5 may also flow into the openings 62. The block 6 is preferably made of transparent material, such that the colors of the materials for forming the handle 5 may be seen through the blocks 6.

Figure 8:
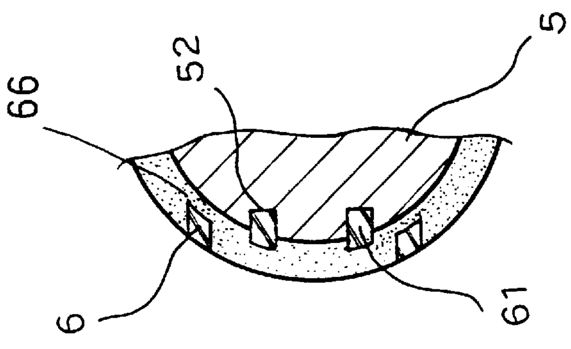
FIG. 8 is a partial cross sectional view illustrating the block as shown in FIG. 7 to be attached to the handle member.
Figure 7:
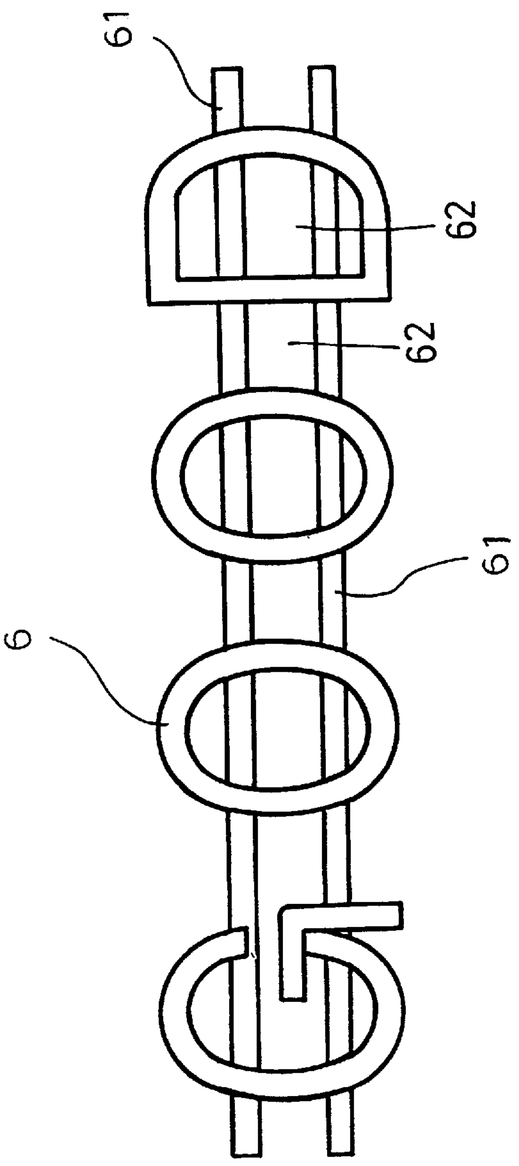
FIG. 7 is a plan view showing another type of the block.

Referring next to FIGS. 7 and 8, the blocks 6 may include various shapes having one or more beams 611 disposed in the bottom portion for forming as the projections 61 as shown in FIGS. 1–6. The beams 611 may be partially extended outward of the handle 5 for forming the gaps 66 between the blocks 6 and the handle 5.

Accordingly, the tool handle in accordance with the present invention may be formed with or arranged into various kinds of shapes or patterns.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tool handle comprising:

a handle body, a plurality of blocks attached to said handle body, said blocks each including at least one opening formed therein, and a cover sleeve engaged on said handle body and including a plurality of orifices formed therein for receiving said blocks.

2. The tool handle according to claim 1, wherein said handle body includes a plurality of cavities formed therein, said blocks each includes at least one projection engaged into said cavities of said handle body for attaching onto said handle body.

3. The tool handle according to claim 1, wherein said cover sleeve includes at least one portion engaged into said at least one opening of said block for further solidly securing said block to said handle.

4. The tool handle according to claim 1, wherein said blocks each includes a gap formed between said block and said handle body.

* * * * *